Nov. 26, 1929.  M. F. BOOTH, JR  1,737,449
SPARK CATCHER
Filed Dec. 21, 1927
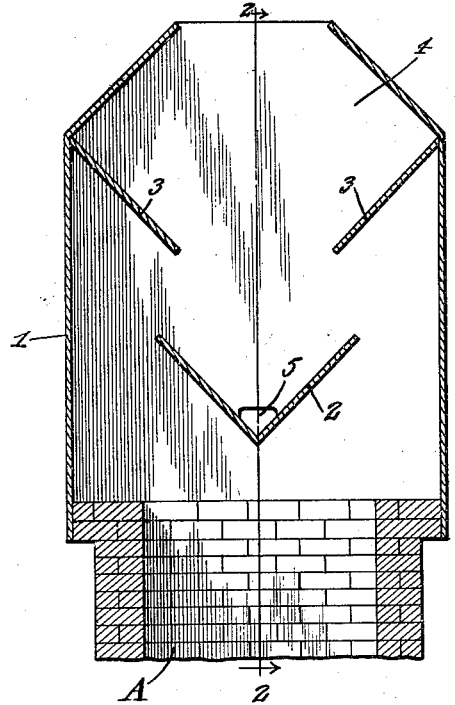
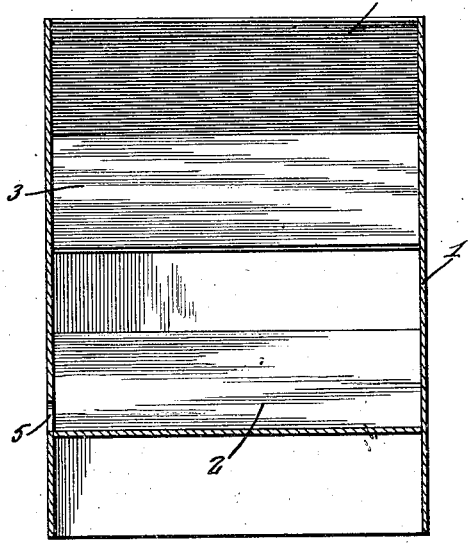
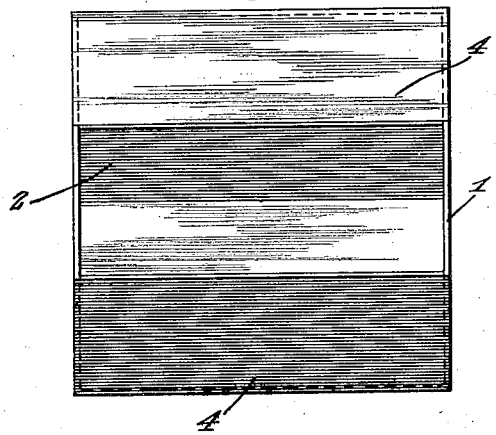
Marcus F. Booth Jr., INVENTOR
BY Victor J. Evans
ATTORNEY

Patented Nov. 26, 1929

1,737,449

UNITED STATES PATENT OFFICE

MARCUS F. BOOTH, JR., OF SPENCER, IOWA

SPARK CATCHER

Application filed December 21, 1927. Serial No. 241,628.

This invention relates to a spark catcher, the general object of the invention being to provide a casing with a trough therein for directing the sparks toward the sides of the casing and with wings in the casing above the trough forming pockets for catching the sparks at the sides of the casing, said trough and wing causing the products of combustion to take a tortuous path through the casing, which will act to extinguish the sparks before they leave the open top of the casing.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view showing the device attached to a chimney.

Figure 2 is a section on line 2—2 of Figure 1.

Figure 3 is a top plan view.

In these views, 1 indicates a casing which has its lower end adapted to be connected with a chimney, such as shown at A. A trough-shaped member 2 is transversely arranged in the casing directly over the outlet of the chimney and a pair of wings 3 slope downwardly and inwardly from opposite sides of the casing, with their inner edges extending inwardly beyond the outer edges of the trough-shaped member. Thus the products of combustion passing from the chimney will strike the trough-shaped member, which will direct the products toward the sides of the casing where they enter the pockets formed by the wings. Then the products of combustion must pass downwardly toward the center of the casing and then pass upwardly between the wings and through the top of the casing. This top is of wedge shape, as shown at 4, with its apex cut off to provide the discharge opening and acts to form an expansion chamber. An opening 5 is formed in each of two sides of the casing so as to permit water collecting in the trough-shaped member 2 to pass from said member.

From the foregoing it will be seen that the products of combustion are caused to take a tortuous path through the casing and thus any sparks will be extinguished by being rubbed against the member 2, the sides of the casing and the wings so that no live sparks will escape from the exhaust of the casing.

It is thought from the foregoing description that the advantages and novel features of my invention will be readily apparent.

It is to be understood that I may make changes in the construction and in the combination and arrangement of the several parts, provided that such changes fall within the scope of the appended claim.

What I claim is:—

A spark catcher comprising a casing adapted to fit over the end of a chimney, a V-shaped member transversely arranged in the lower part of the casing above the chimney opening, wings extending downwardly at an incline from the sides of the casing with their inner ends extending inwardly beyond the vertical planes of the outer edges of the V-shaped member, said wings forming pockets with the sides of the casing for receiving the products of combustion diverted by the V-shaped member, said casing having openings therein at the ends of the V-shaped member whereby liquids collecting in the V-shaped member will escape through said openings and the casing having a top of wedge shape with its apex cut off to form a discharge opening, the said top and wing forming an expansion chamber for the products of combustion.

In testimony whereof I affix my signature.

MARCUS F. BOOTH, Jr.